July 20, 1926.
A. S. MATTHEWS
NONSKID TRACTION SHOE
Filed Oct. 1, 1925   2 Sheets-Sheet 2
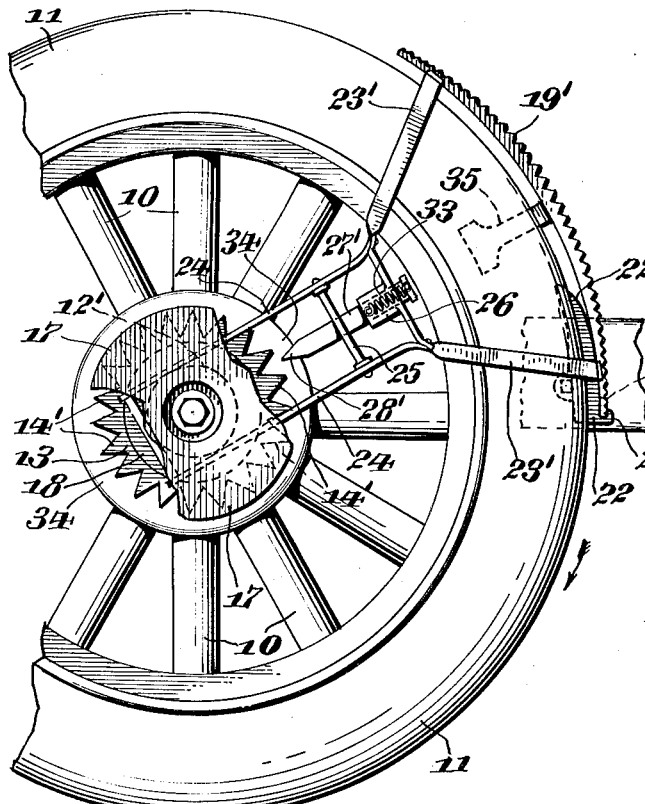
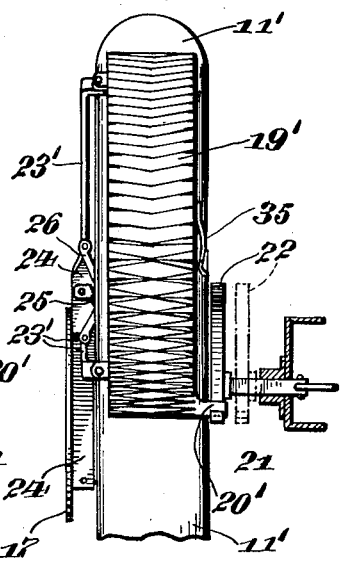
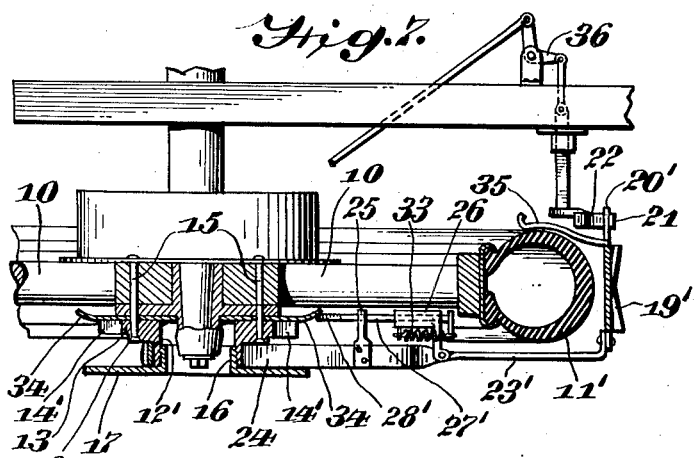
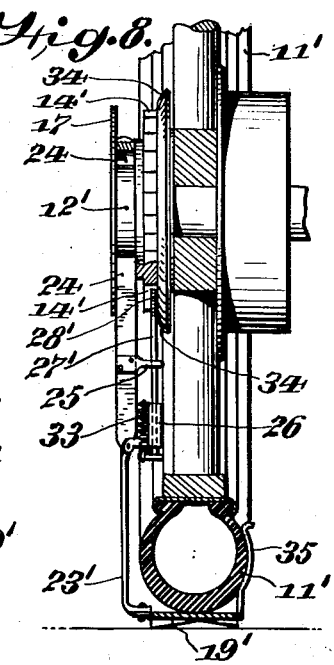
INVENTOR.
Austin S. Matthews,
BY Frank H. Borden
his ATTORNEY.

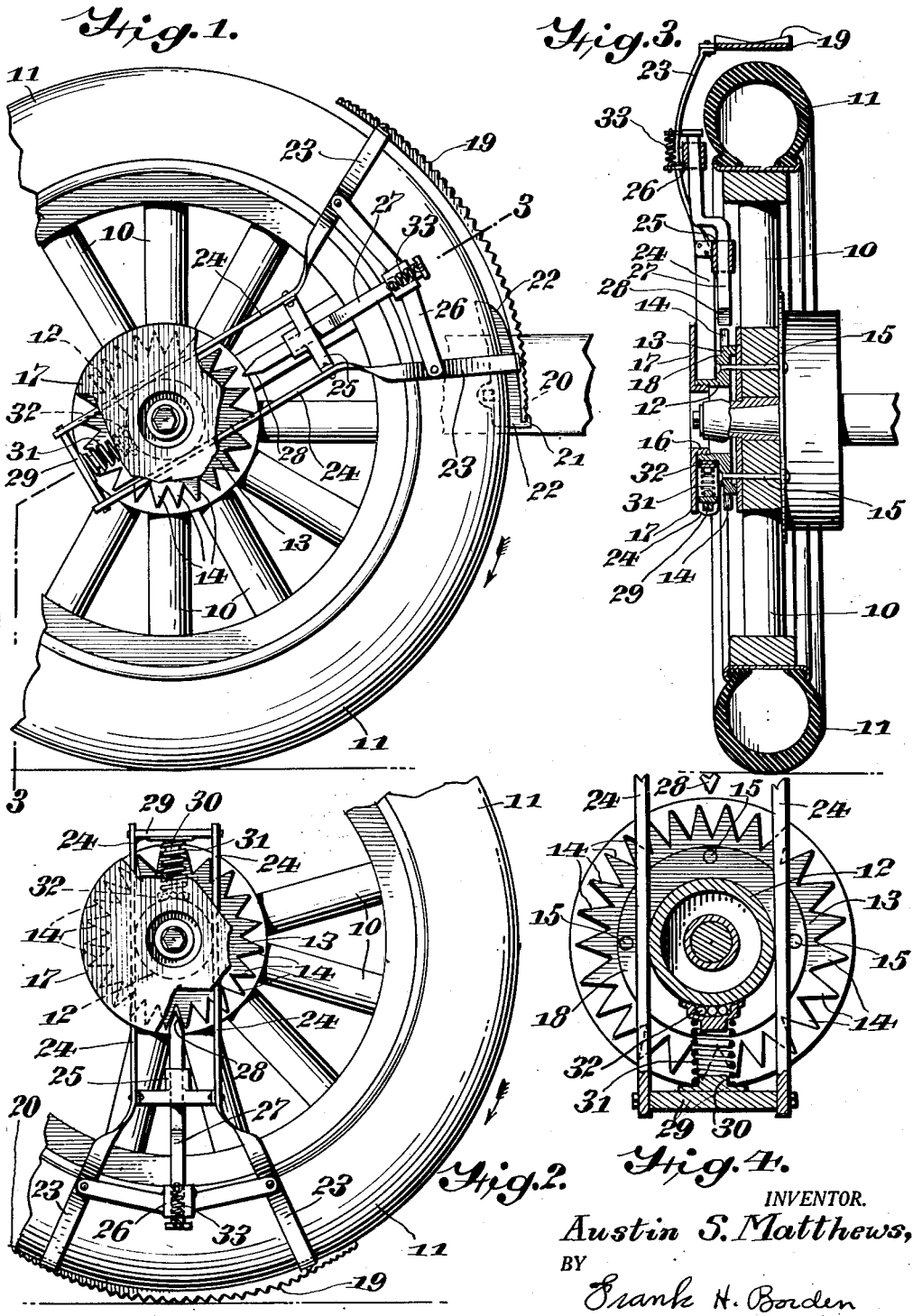

Patented July 20, 1926.

1,593,129

UNITED STATES PATENT OFFICE.

AUSTIN S. MATTHEWS, OF PHILADELPHIA, PENNSYLVANIA.

NONSKID TRACTION SHOE.

Application filed October 1, 1925. Serial No. 59,938.

My invention relates to a non-skid traction shoe, pertaining particularly to a device susceptible to use either in the facilitation of braking of a motor vehicle with elimination of skidding, or as traction means to increase the grip of a wheel in a slippery or resistant medium, such as snow or mud.

Although a number of devices have been evolved to act in an emergency to assist the braking action of a motor vehicle, yet they have many disadvantages. The sudden stopping subjects them to such strain that they are torn loose, or break, and the vehicle must be reversed before they can be replaced in their normal position. Further, it is not possible generally to use them to increase the traction of the wheels in driving.

It is an object of my invention to provide a device instantly available for emergency stopping or braking and which is returnable to an inoperative position without reversing the vehicle.

It is a further object of my invention to provide a device of this class in which the actual braking of the vehicle is controlled by the grip of the brake.

A still further object of my invention is to provide a traction shoe normally stationary relative to the wheel, but which is operable to turn or rotate with the wheel to increase its traction.

Further objects and advantages will become apparent as the description proceeds.

In carrying out my invention I provide a traction shoe normally in an inoperative position, means for locking the shoe with the wheel of a vehicle so that they rotate together, and means for moving the shoe from its engagement with the wheel to its normal inoperative position.

In the accompanying drawings:

Fig. 1, is a side elevation of a portion of a wheel with the traction device in an inoperative position, showing the cam lift or stop, and with the radial pin of the shoe out of mesh with the teeth on the hub.

Fig. 2, is a side elevation of a portion of a wheel, showing the shoe in engagement with the wheel both through contact with the ground and meshing engagement of the radial pin with the teeth on the hub.

Fig. 3, is a vertical section through a wheel and the associated shoe, taken on line 3—3 of Figure 1.

Figure 4, is a side elevation partially in section of the hub and the arms or brackets supporting the shoe, showing the spring tending to pull the radial pin into mesh with the teeth of the hub.

Fig. 5, is a side elevation of a portion of a wheel with a slightly modified form of traction device in an inoperative position.

Fig. 6, is an end elevation of a portion of a wheel and the modified form of shoe disclosed in Fig. 5, and showing in full and dotted lines the two positions of the cam lift or stop used with either form of the invention.

Fig. 7, is a horizontal section through a portion of a wheel showing the modified wheel engaging device shown in Fig. 5, in its disengaged position.

Fig. 8, is a rear or end elevation, partially in section, of a wheel and the modified form of wheel engaging device in its locked or engaged position, and, Fig. 9, is a fragmentary section of a detail of the guide for the radial pin of the modified form of the device.

In the preferred form of my invention, a wheel having spokes 10, and tire 11, carries the hub drum 12, flanged at 13, and the flange having teeth 14. This may be affixed to the wheel in any desired manner, as by bolts 15.

The drum is internally threaded to receive the barrel 16, of the outer flange 17. At the base of the teeth 14 on the flange 13, a solid shoulder is formed as at 18 to keep the arms or brackets of the shoe from accidentally engaging the teeth 14. The hub or drum 12 turns with the wheel.

The traction shoe 19 having serrations or other desirable friction devices on its outer face, has a laterally extending lug or ear 20, adapted normally to be seated in the notch, or stop 21 of the laterally movable cam lift 22. Thus engaged the shoe is maintained in a stationary position relative to the wheel.

The shoe is held or supported by arms or brackets 23, which converge toward the drum, then are parallel to form the sliding pivotal arms 24, which embrace the drum, but which drum has free turning movement between said arms. Cross pieces 25 and 26 are provided in which the radial locking pin 27 having point 28, is slidably mounted.

The free ends of the arms 24 are closed by another cross-piece 29, which carries a shoulder 30 upon which one end of a coil spring 31 is seated. The other end of the coil spring is seated upon a ball bearing or other anti-friction seat 32 engaging the drum 12. This spring is under compression and it will be seen that as it expands it will pull the shoe toward the tire, and simultaneously will pull the radial pin toward the teeth of the drum so as to cause them to mesh. When thus meshed, as in Fig. 2, the shoe will rotate with the wheel, and will continue to do so until radially moved out of such engagement. This radial movement is achieved by the slightly curved cam 22, the upper end of which extends inwardly below the periphery of the tire when axially extended, and the lower end, carrying the stop 21, is appreciably above or beyond such extended periphery, so that when moved laterally of the wheel into a proper position beside the tire the lug or ear 20 of the shoe rides up on the cam pulling the entire mechanism radially out of engagement with the wheel. It may ride thereon until it strikes the notch or stop 21, into which it seats. Lateral movement of the cam pulls out the support for the shoe and it will fall by gravity as well as by the tension of the spring 31, into engagement with the wheel and the cycle begins again. It will be seen that in an emergency, dropping the shoe bringing it into engagement with the wheel, and simultaneously applying the brake, will interpose the shoe between the tire and the ground with a positive stopping action. If the brake is applied but lightly the wheel may be permitted to make a revolution, carrying the shoe, and then applied more tightly with consequent stopping action or deceleration as the shoe touches the ground. Obviously, in snowy or muddy roads, and without using the brake, the shoe may be released and will rotate with the wheel to act as a gripping agent to increase the traction of the wheels. This may be continued as long as desired, then the cam lift is interposed in the path of the lug and the shoe is immediately drawn into its inoperative position.

I prefer to provide a tension spring 33 between the cross-piece 26 and the head of the radial pin so that in the event of a punctured or deflated tire, the shoe may be moved radially toward the wheel a greater distance without any damage to the parts. Obviously as the point of the pin meshed with the teeth, and pressure continued on the shoe the pin would not go further in toward the teeth, but the spring would permit independent movement of the shoe.

The modified form of the device, in which the compression spring, to pull the shoe toward the wheel, is eliminated, relies upon a slight bending of the arms or brackets for a frictional engagement of the wheel and an oppositely disposed inwardly extending spring arm of the shoe.

A curved guide plate 34 is provided which is concentric with the teeth of the drum. It may be integral with the drum or be a separate plate. The radial pin 27' is normally a little closer to the spokes than in the other form, and in such position that the point 28' is out of line with the teeth 14', but is in line with the guide plate 34. The shoe is identical with the preferred form of shoe, as regards lug 20', and the friction surface, but has additionally a spring arm 35, on the opposite side from the arms 23', adapted to bear laterally and frictionally against the side of the tire or wheel 11', when the shoe is moved laterally or axially, a short distance.

The axial movement is had when the shoe 19' is disengaged from the cam lift as the vehicle is moving, by lateral movement of the cam lift operated in any desired manner, as by means of the bell-crank connection 36, although obviously such movement might be had in a number of ways and with a number of different connections. The shoe then drops by gravity, as it is normally supported in practically a horizontal position relative to the body of the vehicle, until it strikes the ground when the wheel immediately runs upon it, forcing the shoe toward the wheel, simultaneously forcing the radial pin 27' against the guide plate 34.

This is the position of the parts as shown in Fig. 9. Continued pressure forces the pin against the guide plate into mesh with the teeth and bending the arms axially of the wheel thus pulling the integral spring arm 35 laterally into frictional engagement with the wheel as shown in Fig. 8. For this purpose there must, of course, be some resilience in the arms 23'.

If continued rotation of the wheel is desired with the shoe rotating therewith, the frictional grip of the spring arm keeps the pin in mesh with the teeth, to be released only at the desired moment by the interposition of the laterally movable cam or stop.

Obviously many changes and additions might be made in the construction of the device, including suitable housings for the parts, (not shown), without departing from the spirit of the invention, and I do no' wish to be limited to the precise details of construction disclosed, except as recited in the appended claims.

I claim as my invention:

1. A non-skid and traction shoe, means for normally maintaining the shoe in an inoperative position relative a vehicle wheel, means for frictionally engaging the shoe with such wheel, and supplemental locking means for positively engaging the shoe with such wheel so that they may rotate together.

2. A non-skid and traction shoe, a bracket upon which the shoe is carried, means normally maintaining the shoe out of engagement with a wheel of a vehicle, means causing the shoe to frictionally engage such wheel, and supplemental locking means engaging the bracket and such wheel to positively lock the bracket to the wheel so that the shoe and wheel may rotate together.

3. As an article of manufacture for attachment to a vehicle wheel, a drum mountable on the outside of such wheel, teeth on said drum, a bifurcated bracket slidably mounted on the drum, a shoe carried by the bracket and movable radially toward the wheel, a cam laterally movable on the other side of the wheel from the drum in such position as normally to engage the shoe and support it in spaced relation to the wheel, means operating to frictionally engage the shoe with the wheel upon movement of the cam, and locking means engaging said teeth upon such operation to positively lock the bracket and the drum so that the shoe and wheel may rotate together.

4. The combination with a vehicle wheel, of a drum carried thereby, a bracket slidably mounted on the drum, teeth on a portion of the drum, meshing means carried by the bracket, a traction shoe carried by the bracket, and means normally maintaining the shoe in a stationary position relative to the rotating wheel, means for releasing the shoe so that it may turn with the wheel, the arrangement being such that the meshing means engages the teeth of the drum so that the shoe and wheel rotate together, said maintaining means so arranged as to disengage the shoe from the wheel when desired.

5. The combination with a vehicle wheel, of a toothed drum carried thereby, a bracket straddling the drum and slidable thereon, a shoe carried by the bracket in position to bear radially against the outer periphery of the wheel, meshing means carried by the bracket adapted upon inner radial movement of the shoe to mesh with the teeth of said toothed drum, a cam lift normally engaging the shoe to maintain it radially removed from the wheel with the teeth and said meshing means out of engagement, with means for moving said cam lift so as to permit inner radial movement of the shoe.

6. The combination with a vehicle wheel, of a shoe, a bracket connected with the shoe, cooperating locking means carried by the wheel and the bracket, means normally tending to lock the locking means to cause the wheel and shoe to rotate together, and means resisting such tendency, to maintain the shoe in a stationary unlocked position.

In testimony whereof I affix my signature.

AUSTIN S. MATTHEWS.